(12) United States Patent
Krist et al.

(10) Patent No.: US 6,513,852 B1
(45) Date of Patent: Feb. 4, 2003

(54) LOCKING SECURITY APPARATUS FOR VEHICLE WITH CANOPY

(76) Inventors: Frederick Krist, 5556-201 A Street, Langley BC (CA), V3A 8K5; Michael Kenneth Noor, 11869th Street, Maple Ridge BC (CA), V2X 5Y2

( * ) Notice: Subject to any disclaimer, the term of this patent is extended or adjusted under 35 U.S.C. 154(b) by 0 days.

(21) Appl. No.: 10/006,148

(22) Filed: Dec. 10, 2001

(51) Int. Cl.[7] ............................................... B60P 1/267
(52) U.S. Cl. .................... 296/50; 296/37.6; 292/289; 224/42.21
(58) Field of Search ....................... 296/50, 37.6, 26.11, 296/56, 100.04; 135/119; 224/321, 326, 401; 292/289, 288

(56) References Cited

U.S. PATENT DOCUMENTS

| | | | | |
|---|---|---|---|---|
| 3,656,800 A | * | 4/1972 | Timmons et al. ............. 296/50 |
| 4,312,452 A | | 1/1982 | Waier | |
| 4,389,862 A | * | 6/1983 | Hastings ..................... 292/288 |
| 4,506,527 A | | 3/1985 | Grill | |
| 4,819,461 A | * | 4/1989 | Pearson ...................... 292/289 |
| 4,834,273 A | * | 5/1989 | Cimino ................... 224/42.21 |
| 4,938,519 A | * | 7/1990 | Schlachter .................. 224/401 |
| 4,993,610 A | * | 2/1991 | Abretske et al. ......... 224/42.21 |
| 4,998,425 A | * | 3/1991 | Hoogland .................. 296/37.6 |
| 5,151,934 A | * | 9/1992 | Hayashi ....................... 379/159 |
| 5,154,459 A | * | 10/1992 | Cochran ..................... 292/288 |
| 5,165,743 A | | 11/1992 | Zock | |
| 5,284,036 A | * | 2/1994 | Rosenbaum ................. 292/218 |
| 5,623,841 A | * | 4/1997 | Deemar ....................... 292/289 |
| 5,669,641 A | * | 9/1997 | Jeansonne ................... 292/289 |
| 5,701,768 A | | 12/1997 | Khalsa | |
| 5,711,555 A | * | 1/1998 | Leedy ......................... 292/202 |
| 5,738,397 A | * | 4/1998 | Grody et al. ............... 292/258 |
| 5,865,485 A | * | 2/1999 | Lawhorne, Jr. ............. 292/289 |
| 5,876,086 A | * | 3/1999 | Lagrou et al. ................ 296/50 |
| 5,951,233 A | * | 9/1999 | Boucher et al. .............. 296/50 |
| 6,056,794 A | * | 5/2000 | Stoetzel et al. ............... 51/295 |
| 6,427,500 B1 | * | 8/2002 | Weinerman et al. ....... 296/37.6 |

* cited by examiner

*Primary Examiner*—Kiran Patel
(74) *Attorney, Agent, or Firm*—Robert H. Barrigar

(57) ABSTRACT

A releasably securable security apparatus for securing the tailgate and rear canopy window of a pick-up vehicle equipped with a canopy, provides a releasably securable securing frame and a mounting means capable of being attached and secured to the side walls of the cargo box of the pick-up vehicle. The securing frame is mountable onto the pick-up vehicle, such that when in a closed position, the securing frame is positioned generally astride a tailgate and rear canopy window of the pick-up vehicle, and when secured in such closed position, prevents the tailgate and/or rear canopy window from being opened, and when in an open position, allows the tailgate and/or the rear canopy window to be opened so as to allow loading and unloading. The securing frame may be one-piece or two-piece. The two-piece securing frame comprises two gates, each for mounting on an opposite side of the rear of the pick-up and gates lockable to each other in the closed position.

23 Claims, 13 Drawing Sheets

LOCKING SECURITY APPARATUS FOR VEHICLE WITH CANOPY

FIELD OF THE INVENTION

This invention relates to a locking security apparatus for a vehicle that is equipped with a canopy or similar closeable cover or housing, in particular, such locking security apparatus for a pick-up vehicle, such as a pick-up truck, that is equipped with a canopy.

BACKGROUND OF THE INVENTION

Open-deck vehicles such as pick-up trucks are often provided with a canopy. Such a canopy is used to protect cargo carried in the cargo box of a pick-up vehicle from rain, snow, dust and falling debris. Additionally, a canopy may offer some protection against and deter thefts from the back of the pick-up vehicle. A canopy is typically made from material of relatively rigid construction, most commonly fibreglass, and is secured to or installed upon the cargo box side walls. Many canopies are provided with a rear canopy window that is made from transparent or semi-transparent material such as glass or clear plastic, so as to enable the driver to see to the rear of the pick-up vehicle. This rear canopy window may optionally be in the form of a releasably securable window or hatch.

Pick-up vehicles are commonly used as work vehicles and used to transport large, and often expensive, items such as tools. Consequently, such vehicles are often targeted for thefts. For those vehicles equipped with canopies, the preferred route of access by thieves is through the back of the canopy-equipped pick-up vehicle, particularly when relatively long or bulky items are to be removed, since it is generally easier to slide these items through the back. Further, as already described, most canopies are provided with a rear canopy window typically made of glass or plastic, which canopy window is hence often easier to break compared with some of the other exposed portions of the canopy (which are typically made of fibreglass or aluminum). Thieves, especially when attempting to steal very bulky items, will break the rear canopy window or, if the rear canopy window is in the form of a hatch, will break or prise open the hatch. The items in the back of the vehicle can then be slid out through the back and removed via the broken or prised-open hatch or window. In many instances, breaking or prising open the rear canopy window will further allow the thieves to open the rear tailgate of the pick-up vehicle. Once the tailgate is opened, the bulky items can often be slid out through the back of the pick-up vehicle even more easily and quickly (items can be removed without having to lift them over the closed tailgate). Alternatively, thieves may choose to gain access by prising open the tailgate alone (without first breaking or prising open the rear window).

Various methods have been devised to address the theft problem. Pearson teaches a truck canopy and tailgate locking means in U.S. Pat. No. 4,819,461. Pearson discloses a locking device for securing the rear canopy door and tailgate of a canopy-equipped truck to the truck's rear bumper; this locking device comprises a bar, that can be secured to the handle apparatus of a truck canopy so as to extend vertically through a hole in the rear bumper and be secured in place by use of a padlock. This locking device necessitates the truck canopy having a protruding handle mechanism, and also requires holes to be drilled in a portion of the rear bumper. Further, this locking device has the drawback of not being very effective in deterring or hindering thieves from stealing items from the back of the truck by obtaining access through the rear canopy window. If the rear window is broken, all but the most bulky of items can still be removed through the rear window with relative ease.

Zock in U.S. Pat. No. 5,165,743 discloses a tailgate locking device for securing the tailgate and canopy of a truck, which device locks the handle of the tailgate and the handle of the canopy together. This device also suffers from the same drawback described for Pearson in that the locking device is ineffective in hindering or preventing thefts where access is gained by breaking or prising open the rear canopy window.

SUMMARY OF THE INVENTION

In this specification and in the claims, terms such as up and down, left and right, and horizontal and vertical are used to describe the invention and its embodiments. These terms are used for convenience as they relate to the orientation of the embodiments of the invention as typically installed on a pick-up vehicle. These terms are used solely to aid in describing the invention and the invention is not limited to embodiments conforming to the described orientations.

It is an object of the present invention to provide a security apparatus for releasably securing a rear canopy window (or rear canopy door) and tailgate of a canopy-equipped pick-up vehicle, so as to prevent, or at the very least hinder, thefts from the cargo box of such pick-up vehicle. It is a further object of the invention to provide a security apparatus for securing the rear window and tailgate of a canopy-equipped pick-up vehicle, which apparatus can be easily repeatedly locked and unlocked as desired to allow loading into, and unloading from, the cargo box. It is an object of an aspect of this invention to provide an apparatus for securing the rear window and tailgate of a pick-up vehicle equipped with a canopy, which apparatus can be easily installed onto existing canopy-equipped pick-up vehicles and easily uninstalled as required. Other objects and advantages of the present invention will become more apparent in light of the following description.

The invention in one embodiment is a releasably-lockable security apparatus comprising two mounts, for installing on a canopy-equipped pick-up vehicle, and a securing frame mountable on the mounts. When the mounts are installed on the pick-up vehicle the securing frame can be mounted on the mounts and locked in a closed position wherein the securing frame spans and closely overlies the tailgate and window so as to prevent the tailgate and window from swinging open. The securing frame is preferably a pair of gates whose distal ends can be locked together, each gate in one embodiment pivoting about a substantially vertical axis located at the outside of the cargo box in the vicinity of the back of the pick-up vehicle, with the mounts each preferably providing pivotal support for an associated gate. The securing frame is preferably sized and shaped such that when the securing frame is in the closed position, it impedes removal of objects from the cargo box through the window opening even if the window is forced open or broken. The securing frame can be moved, either by swinging the securing frame or removing the securing frame from the mounts, to an open position wherein the securing frame does not impede the opening of the window and tailgate, and thus allows items to be loaded into, and unloaded from, the cargo box.

Preferably the mounts can be installed on the sides of the pick-up vehicle such that when the securing frame is in the closed position the securing frame extends substantially horizontally across the rear of the pick-up vehicle. Alternatively, one mount can be installed below the tailgate, and the other mount can be installed above the window such that when the securing frame is in the closed position the securing frame extends between above the window and below the tailgate. In a preferred embodiment, the mounts are suitable for attaching to the sides of the pick-up vehicle such that the securing frame extends horizontally across the rear of the pick-up vehicle when in the closed position. The securing frame is preferably two-part, but the securing frame may in some embodiments be one-part. With a two-part securing frame, the securing frame comprises: two gates, each gate pivotally attached to a respective mount such that each gate can be independently swung through a substantially horizontal arc; and a means for releasably locking the gates, one to the other, in the closed position. With a one-part securing frame, the securing frame may be releasably lockable in that each end of the securing frame is releasably lockable to a respective mount, or the securing frame may be swingable in that one end of the securing frame is releasably lockable to one mount and the other end of the securing frame is pivotally attached to the other mount such that the securing frame can be swung through a substantially horizontal arc between the closed position and the open position, and releasably locked in the closed position.

The securing frame preferably has an open-frame configuration, perhaps grid-like or truss-like, so as to provide a relatively high area coverage and strength with relatively low weight. The securing frame may be shaped or positioned such that a portion of it aligns with and covers the tailgate latch/handle and/or lock and optionally, also the window latch/handle, thus hindering or preventing access to same when the securing frame is in the closed position. Other shapes of the securing frame are possible, and the shape of the securing frame should not be limited to that described herein. It is preferable that the overall shape of the securing frame be such that, when in the closed position, the securing frame will effectively prevent the tailgate and rear canopy window from being opened. The securing frame also preferably overlaps a significant portion of the rear canopy window so that, even if the rear canopy window is broken or prised open, the securing frame can serve to hinder access to the cargo box of the pick-up vehicle and also hinder the removal of cargo, especially large items, through the back of the pick-up vehicle.

In a preferred embodiment each mount is attached to the pick-up vehicle at the joint between the top of the respective side wall and the canopy. Each mount includes a mounting plate for interposing between the top of the respective side wall and the canopy. Each mounting plate may include a downward-projecting tang that abuts the inside top edge of the respective side wall when in use and through which conventional fasteners, such as screws and bolts may be inserted to fasten the mount to the pick-up vehicle. As well, the position of the mounting plates between the side walls and canopy further secures the mounting plates. It is typical for canopy-equipped vehicles to have one or more canopy clamps on each side of the canopy for securing the canopy to the side walls. Typically, the canopy clamps latch onto the side walls of the cargo box. The canopy may be further secured with conventional fasteners such as screws or bolts. For the present invention, it is preferable to provide mounting plates that can be sandwiched between the canopy clamps and the top of the side walls of the cargo box of the pick-up vehicle so that the mounting brackets can be conveniently secured without requiring additional drilling of screw holes or threaded bore holes into the side walls.

Alternatively, the mounts can be located at some position on the side wall other than where the canopy clamps are located, although this will necessitate the additional drilling of holes so that the mounting brackets can be secured to the side wall.

In another embodiment, where it is preferable to be able to both swing and remove the securing frame, each of the gates (or the securing frame, in the case of a one-part securing frame) is releasably pivotally attached to a respective associated mount. The gates can be removed from their associated mounts when in a position other than locked in the closed position. In one embodiment, each gate comprises a downward-opening socket and each mount comprises an upwardly-projecting plug sized and shaped for insertion and partial rotation within the socket. The socket and plug include means for preventing withdrawal of the plug from the socket in a certain pivotal position of the gate while permitting withdrawal of the plug in another pivotal position or positions. In one embodiment providing a bayonet-type interconnection of plug and mating socket, the plug includes an L-shaped slot having a vertically-extending portion and a horizontally-extending portion; and the socket includes a pin sized so that the L-shaped slot can contain the pin. The pin and L-shaped slot act to retain the socket on the plug when the pin is within the horizontally-extending portion of the L-shaped slot and not within the vertically-extending portion of the L-shaped slot and to permit withdrawal of the plug when the pin is within the vertically-extending portion of the L-shaped socket. As well, the L-shaped slot can be shaped to prevent the securing frame or gates from swinging outward past a preferred position, for example, past roughly parallel with the side walls so as to prevent the securing frame or gates from swinging into traffic, and to prevent the securing frame or gates from swinging inward against the tailgate and window so as to prevent damage to the tailgate and window caused by the impact of a swinging securing frame or gate.

The means for releasably locking the gates together in the closed position preferably includes locking components at the distal end of each gate such that the means for releasably locking the gates is positioned generally between the two gates. It is desirable not to have the locking means too exposed, since thieves may attempt to break the locking means by the application of suitable force—e.g. by using a heavy-duty hammer or bolt cutters. Thus, in accordance with a preferred embodiment of this invention, the locking means is at least partially housed behind a cover plate, or within a sturdy lock housing, so that it is not fully exposed.

A one-part securing frame may preferably be releasably locked to the pick-up vehicle by means of a mount including a lock. In a preferred embodiment, the mount has an upwardly-projecting lock plug sized for insertion into a downwardly-facing lock bore within the securing frame. The lock plug contains a key lock projecting into a lock cavity and having a lock hook. The lock bore contains an eye engageable with the lock hook when the lock plug is inserted into the lock bore so as to releasably lock the securing frame.

Preferably, the security apparatus is additionally provided with means (e.g., telescoping means) for adjusting the span of the security frame, so that the security apparatus can be adapted for pick-up vehicles of differing sizes.

It is common for users to additionally equip their canopy-equipped vehicles with a roof rack. Often, a roof rack is affixed to a number of (typically four) vertical struts, and mounted onto and secured to two side rails running along each side of the vehicle, which side rails are clamped between the cargo box and the canopy, and secured in place by nuts and bolts or screws. Such side rails afford an alternative way of attaching the mounts to the pick-up vehicle. The mounts may optionally be attached, typically with conventional fasteners such as screws, or nuts and bolts to the side rails, instead of to the top of the side walls of the cargo box as previously described.

DETAILED DESCRIPTION OF THE PREFERRED EMBODIMENT

Figure 1:
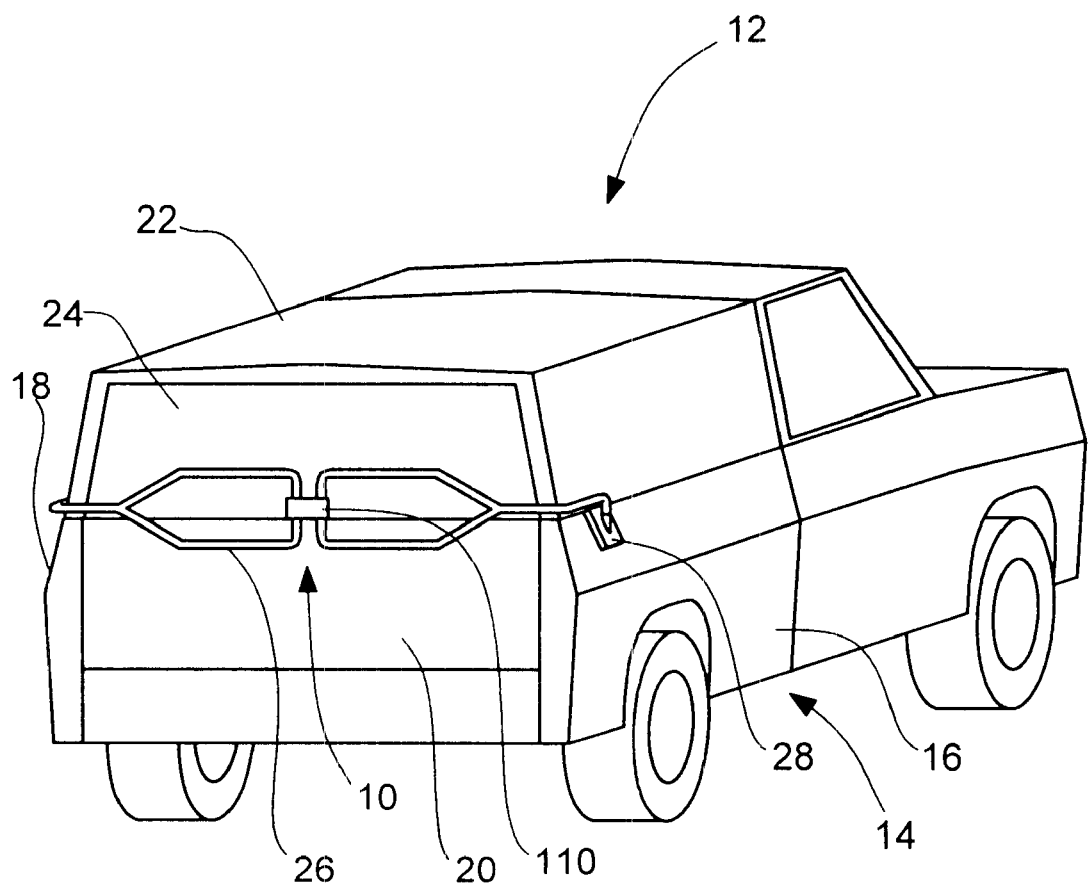
FIG. 1 is a schematic isometric view of a pick-up vehicle equipped with a canopy and a security apparatus in accordance with an embodiment of the present invention.

Referring to FIG. 1, an embodiment of the security apparatus 10 is shown mounted across the back of a pick-up vehicle 12. The pick-up vehicle 12 has a cargo box 14 with a right side wall 16, a left side wall 18 and a tailgate 20. A canopy 22 is mounted on the cargo box 14. The canopy 22 has a window 24, shown in the closed position, that can pivot at its top edge to swing upwards to an open position (not shown).

As shown in the drawings, the security apparatus 10 includes a securing frame 26, a right mount 28 and a left mount 30. The securing frame 36 is shown in FIG. 1 in the closed position, that is, the securing frame 36 is situated astride the back of the pick-up vehicle 12, about and in close proximity to the tailgate 20 and window 24, thereby preventing the tailgate 20 and window 24 from opening outwards, and also impeding the removal of items through the rear of the canopy 22 should the window 24 be broken.

The embodiment of the securing frame shown in FIGS. 1, 2, 4 and 5, is two-part, comprising a right gate 32 and a left gate 34. As shown in FIGS. 1, 2, 4 and 5, the right gate 32 and associated right mount 28, are substantially a mirror image of the left gate 34 and associated left mount 30. Therefore, except where the gates and associated mounts differ from each other, only one gate and mount will be described and it is understood that the description of the gate and mount applies equally to the right gate 32 and right mount 28, and the left gate 34 and left mount 30.

Figure 4:
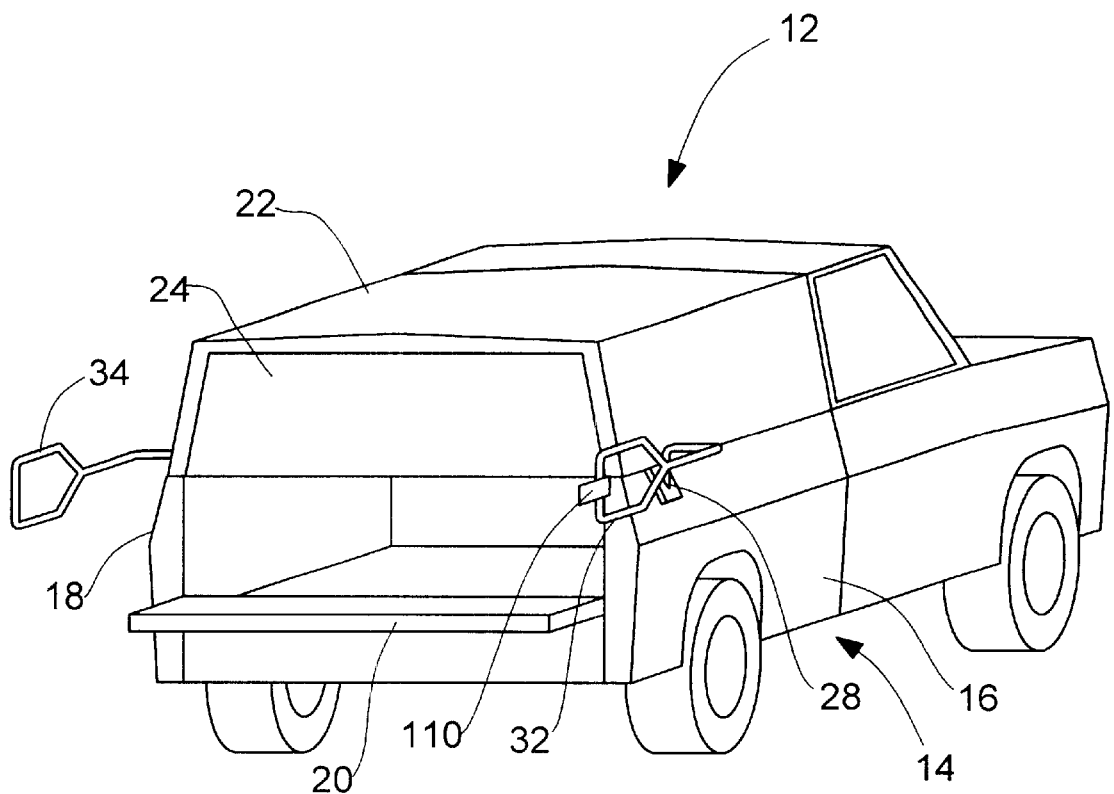
FIG. 4 is a schematic isometric view of a pick-up vehicle, showing an embodiment of the present invention with the left and right gates swung open and the tailgate opened
Figure 5:
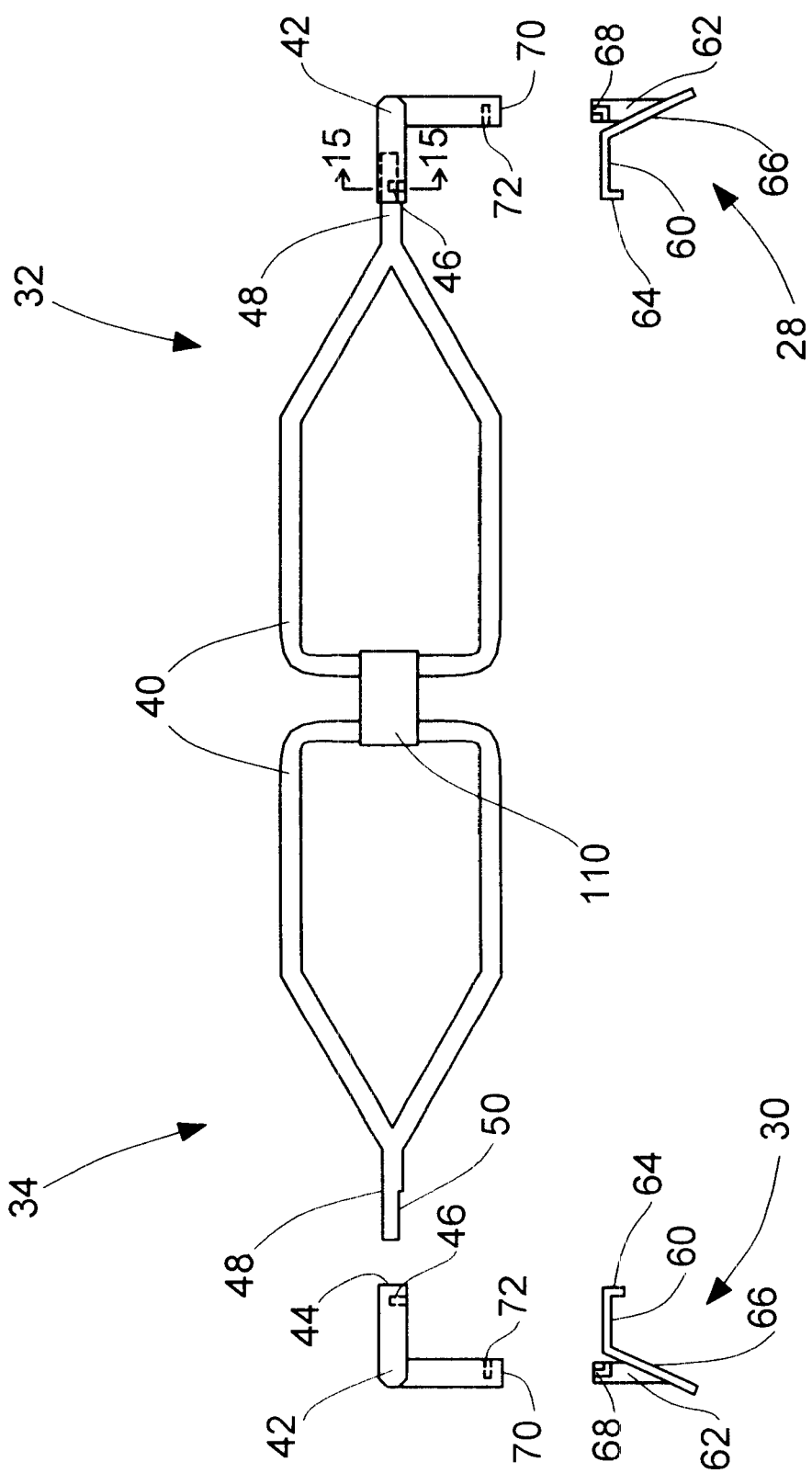
FIG. 5 is an exploded elevation view of a security apparatus in accordance with an embodiment of the present invention.

In the embodiment shown in FIG. 5, each gate is two-piece, comprising a barrier 40 and an arm 42. In the embodiment shown in FIG. 5, the barrier 40 is paddle-shaped, but the barrier 40 can be any shape that, when the securing frame 26 is closed, prevents the tailgate 20 and window 24 from opening and acts to, at least in part, block the removal of items through the window 24 in the event the window 24 is broken. The arm 42 has a roughly ninety degree bend in a substantially horizontal plane, so as to enable the arm 42 to reach the back of the pick-up vehicle when mounted on the side of the pick-up vehicle 12. In the embodiment shown in FIGS. 1, 2, 4 and 5, the arm 42 also has a roughly ninety degree bend in a substantially vertical plane, so as to enable the arm 42 to be mounted on the embodiment of the mount shown in those drawings.

The arm 42 has an adjustment bore 44 having an internally-projecting adjustment lug 46. The barrier 40 has an adjustment insert 48 sized for loose-fit insertion into the adjustment bore 44 and a longitudinally-extending adjustment slot 50, sized to contain the adjustment lug 46 so as to prevent the barrier 40 and arm 42 from rotating relative to each other, but so as to permit the adjustment insert 48 to slide longitudinally within the adjustment bore 44, when the adjustment insert 48 is inserted into the adjustment bore 44. In this way, the length of the gates can be adjusted to accommodate cargo boxes 14 of different widths. Other means for adjustably connecting the arm 42 and barrier 40 are possible, and would be apparent to one skilled in the art, such as for example, the use of a threaded rod in combination with a receiving threaded socket (not shown), said threaded rod affixed to the arm 42 and the receiving threaded socket affixed to the barrier 40, or vice versa. As well, in some situations it is not necessary to be able to adjust the length of one or both gates, in which case one gate or both gates can be one-piece.

Figure 2:
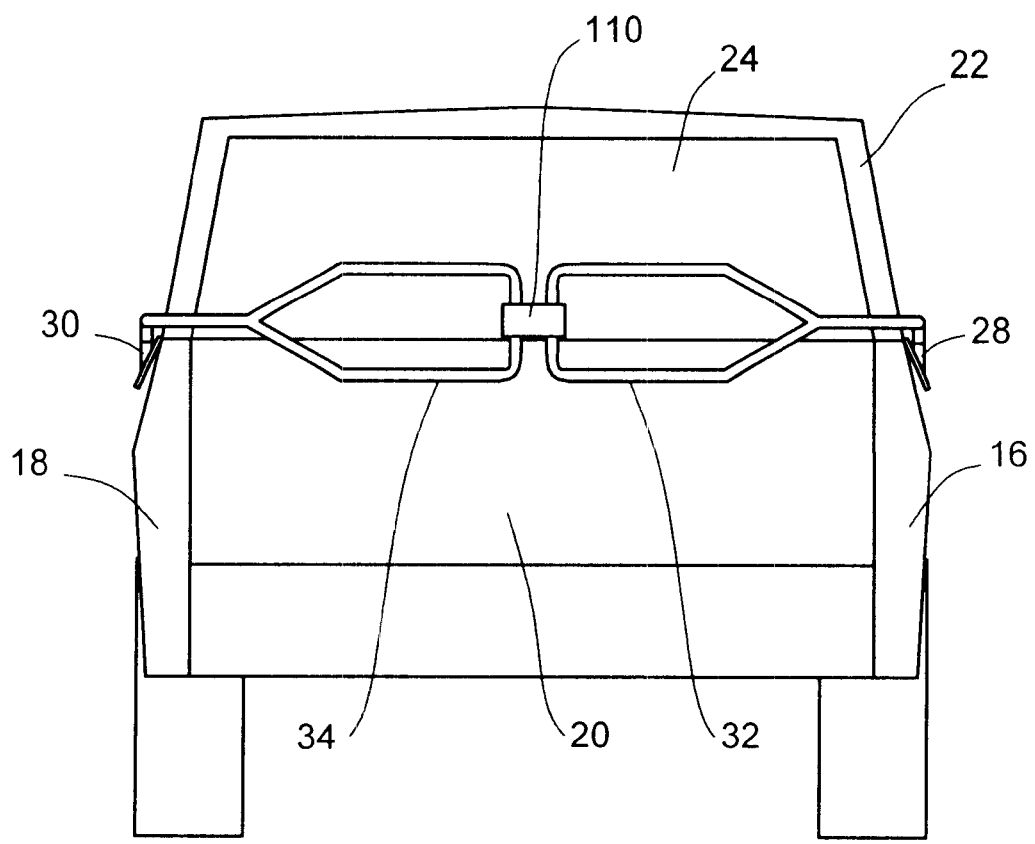
FIG. 2 is a rear elevation view of the pick-up vehicle and security apparatus of FIG. 1.
Figure 3:
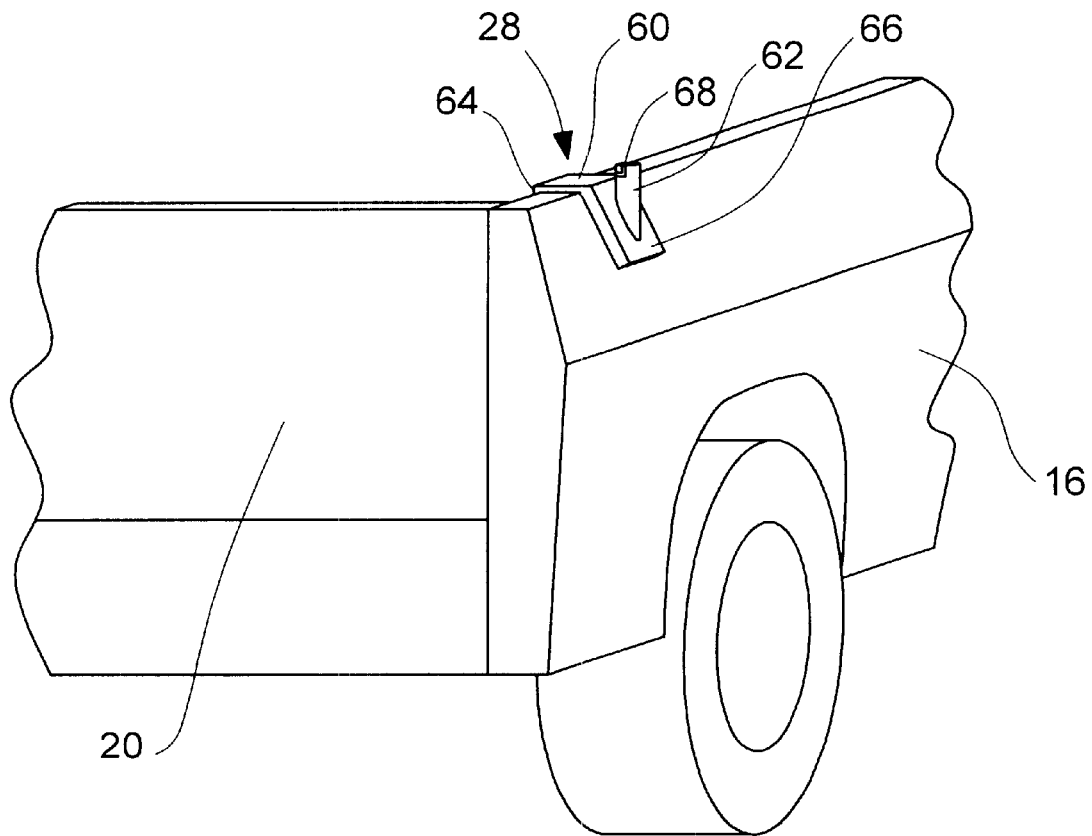
FIG. 3 is a schematic isometric view of the right, rear corner of the pick-up vehicle showing a mount positioned on the side wall of the pick-up vehicle in accordance with an embodiment of the present invention, shown without the canopy for clarity.

One mount embodiment, shown in FIGS. 3 and 5, includes a mounting plate 60 and a vertical plug 62. The mounting plate 60 is shaped so as to span the top of the right or left side wall 24, 26, with, as shown in FIG. 5, a downward-projecting tang 64, which abuts the top inside edge of the sidewall 24, 26 when the mounting plate 60 is in use and through which conventional fasteners, such as screws or bolts (not shown) can be inserted to fasten the mounting plate 60 to the sidewall. The mounting plate 60 includes a sloped platform 66 to which the plug 62 is attached and from which the plug 62 projects vertically upwards. In FIG. 3, the canopy 22 is not shown so as to better show the position of the right mount 28 on the right sidewall 16. In normal use, as shown in FIGS. 1, 2 and 4, the mounting plate 36 is interposed between the top of the respective right or left sidewall 16,18, and the canopy 22. As shown in FIG. 5, the plug 62 has an L-shaped slot 68 and the arm 42 has a downward-facing socket 70 with an internally-projecting pin 72. The plug 62 is sized for loose-fit insertion into the socket 70, and the pin 72 and L-shaped slot 68 are sized so that the L-shaped slot 68 can contain the pin 72, such that the plug 62 can be inserted into, and removed from, the socket 70 when the pin 72 is within the vertically-extending portion of the L-shaped slot 68, and the plug 62 can be rotated within the socket 70, when the pin 72 is within the horizontally-extending portion of the L-shaped socket 70. The pin 72 and L-shaped slot 68 act to retain the socket 70 on the plug 62 when the pin 72 is within the horizontally-extending portion of the L-shaped slot 68 and not aligned within the vertically-extending portion of the L-shaped slot 68. In use the pin 72 and L-shaped slot 68 are oriented to act to retain the plug 62 within the socket 70 when the respective gate is in position across the back of the pick-up vehicle 12 so as to prevent the tailgate 20 and window 24 from opening outwards, and to permit the arm 42 to be lifted from the plug 42 when the arm 42 is swung outward to some other position. As well, the L-shaped slot 68 can be shaped to prevent the gates 32, 34 from swinging outward past a certain position, for example, past roughly parallel with the side walls 16, 18 so as to prevent the left gate 34 swinging into traffic when the pick-up vehicle is parked at the side of the road, and to prevent the gates 32, 34 from swinging inward against the tailgate 20 and window 24 so as to prevent damage to the tailgate 20 and window 24 caused by the impact of a swinging gate 32, 34. FIG. 4 shows this embodiment of the security apparatus 10 with the left and right gates 32, 34, swung open and the tailgate 20 lowered for access to the cargo box 14.

Figure 6:
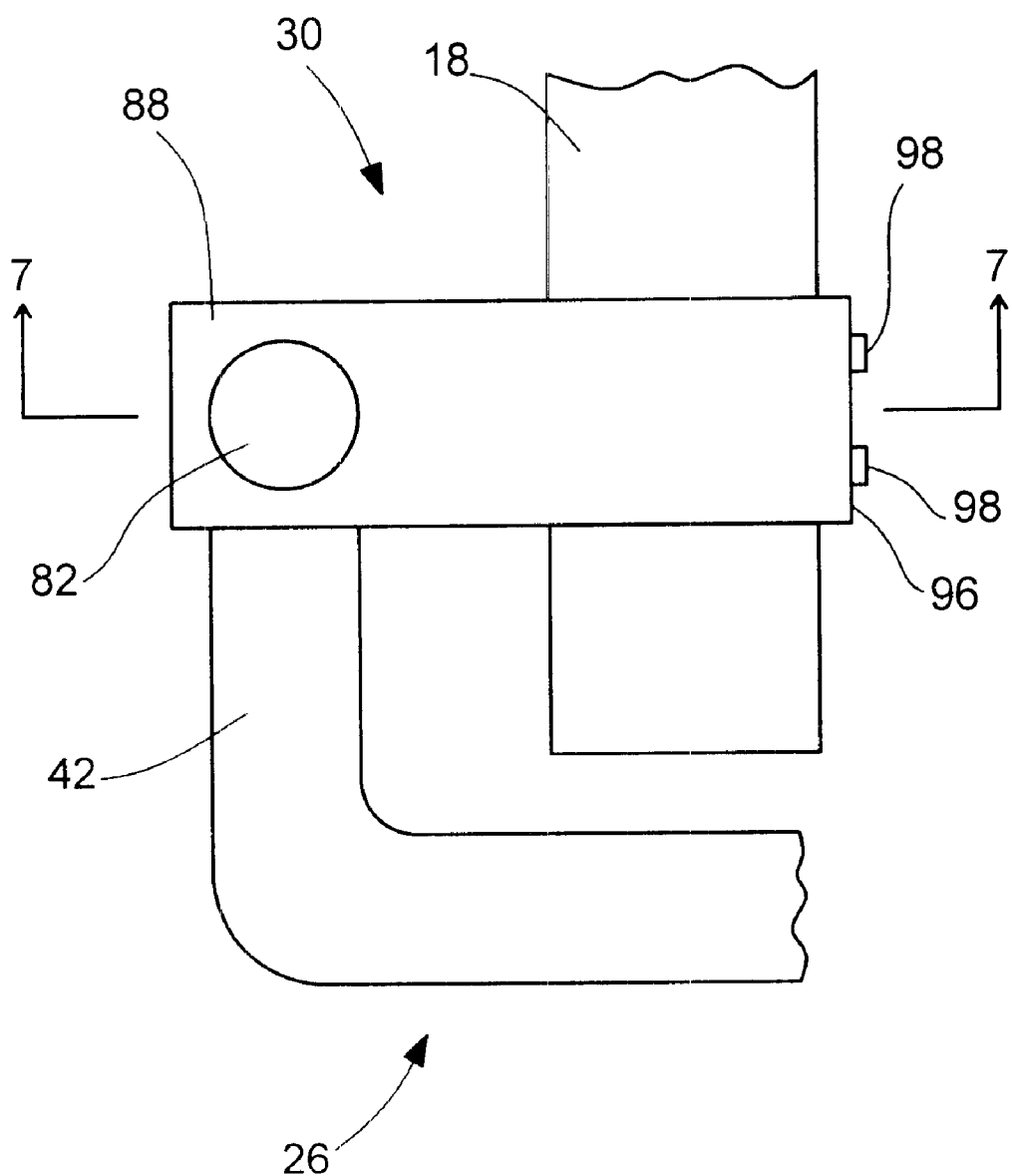
FIG. 6 is a top plan view of one embodiment of the mount of the present invention, shown without the canopy for clarity.
Figure 7:
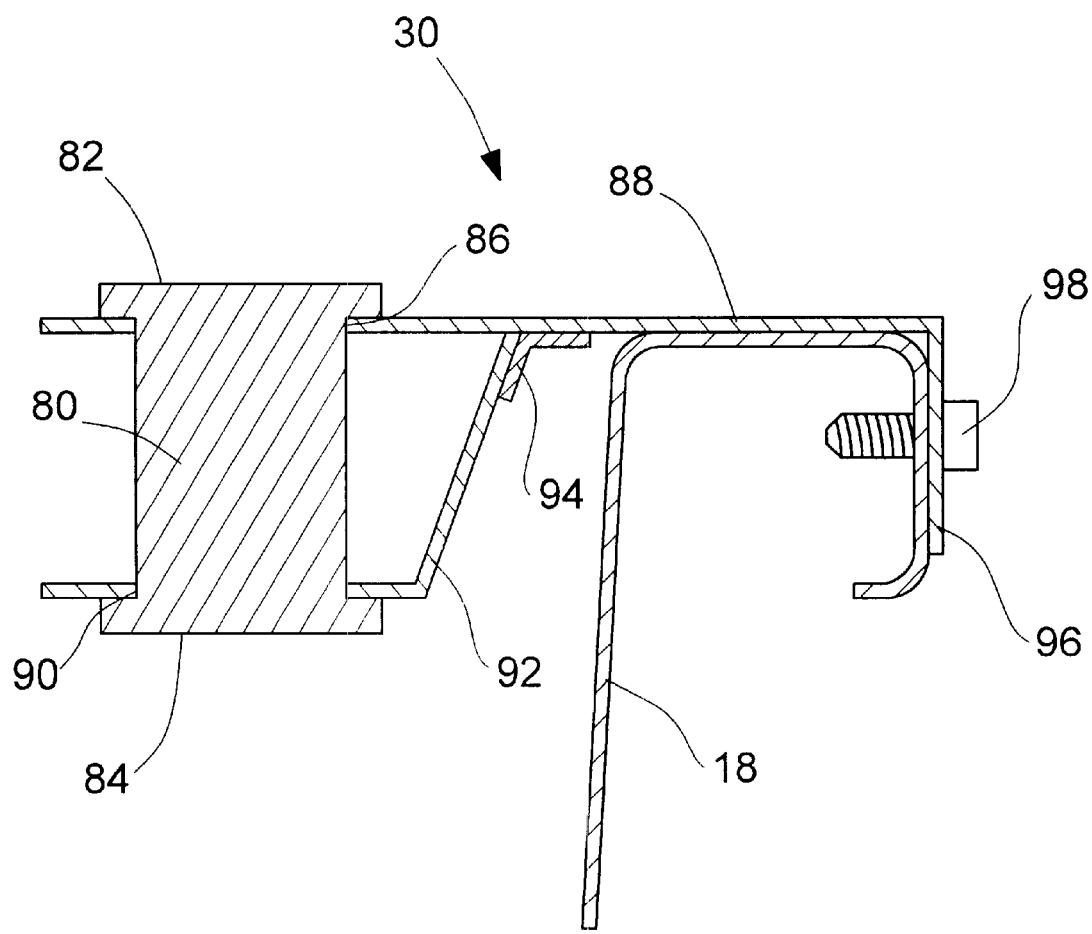
FIG. 7 is a sectional view of the mount of FIG. 6.

In another mount embodiment for use where it is not desirable to be able to remove the gates or one-piece securing frame, as the case may be, shown, without the canopy 22, in top plan view in FIG. 6 and in sectional view in FIG. 7, the arm 42 is attached to a pivot cylinder 80. The pivot cylinder 80 has a top washer 82 and a bottom washer 84. The pivot cylinder 80 projects through, and fits loosely within, the top hole 86 in the top strap 88 and the bottom hole 90 in the bottom strap 92, so as to permit the pivot cylinder 80 to rotate relative to the top and bottom straps 88, 92. The top washer 82 is larger than the top hole 86 and acts to prevent the pivot cylinder 80 from moving downward through the top strap 88. The bottom washer 84 is larger than the bottom hole 90 and acts to prevent the pivot cylinder 80 from moving upward through the bottom strap 92. The bottom strap 92 is attached to the top strap 88 at the gusset 94. The top strap 88 extends across the top of the of the side wall (the left side wall 18 in FIGS. 6 and 7) and has a downward-projecting member 96 having fastener holes (not shown) through which conventional fasteners such as screws 98 or bolts can be inserted to attach the top strap 88 to the side rail. This mount embodiment does not require that the arm 42 have a bend in a substantially vertical plane, but does require that the arm 42 have a bend in a substantially horizontal plane. The arm 42 projects horizontally from the pivot cylinder 80 and the rotational freedom of the pivot cylinder 80 within the top and bottom strap 88, 92 permits the arm 42 to swing in a horizontal arc.

Figure 8:
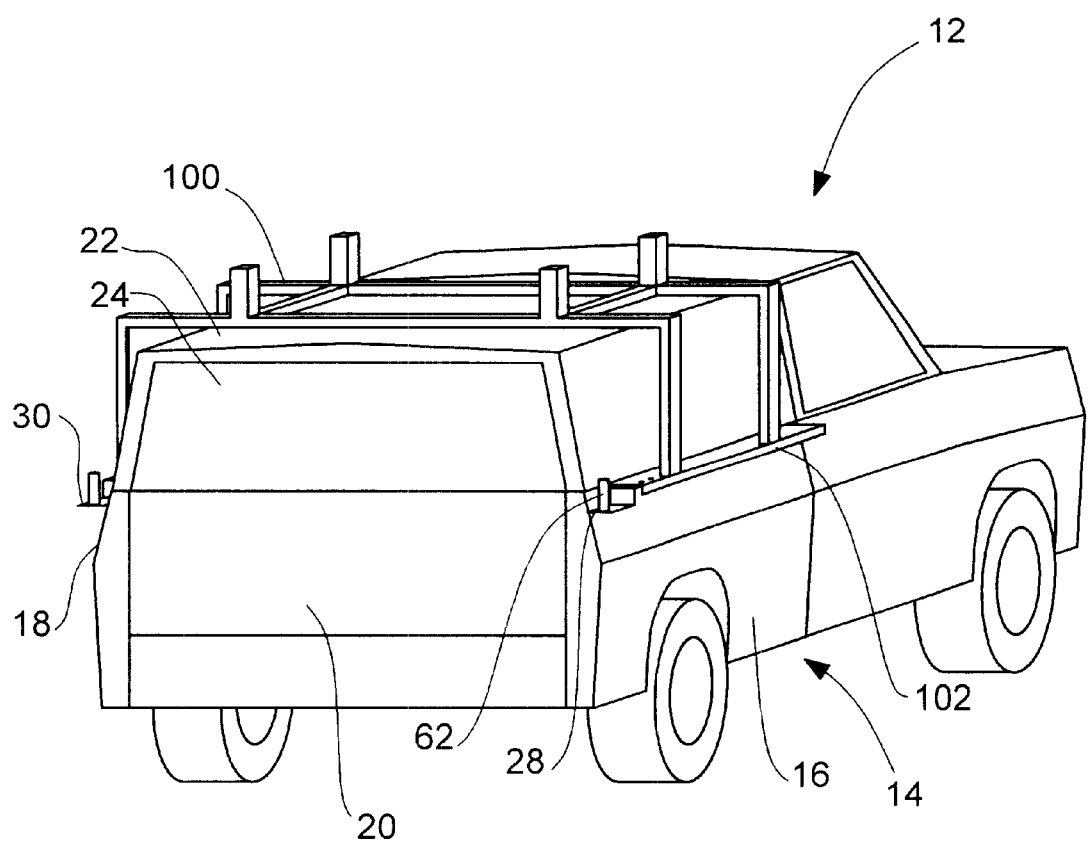
FIG. 8 is a schematic isometric view of a pick-up vehicle showing a mount of an embodiment of the present invention for use with a roof rack.

FIG. 8 shows another mount embodiment for use with a pick-up vehicle 12 equipped with a roof rack 100 having longitudinally-extending side rails 102 interposed between the top of the side walls 16, 18 and the canopy 22. As shown in FIG. 8, typically with such roof racks 100, a portion of each side rail 102 projects from the sides of the vehicle, usually along the whole length of the sidewalls 16, 18 as shown in FIG. 8. A mount 28, 30 can be attached to the side rails 102, typically with nuts and bolts, or by welding. FIG. 8 shows a mount 28 of the type having a plug 62, attached to the rearward end of the side rail 102, but it will be clear that other mount embodiments such as that shown in FIGS. 6 and 7 can be adapted for attaching to the side rails 102. The mount embodiment shown in FIGS. 6 and 7 can be adapted for attaching to the side rails 102 by removing the downwardly projecting member 96 so that the top strap 88 can be attached to the bottom or top of the side rails 102 with any conventional fastener such as nuts and bolts, or by welding.

Figure 9:
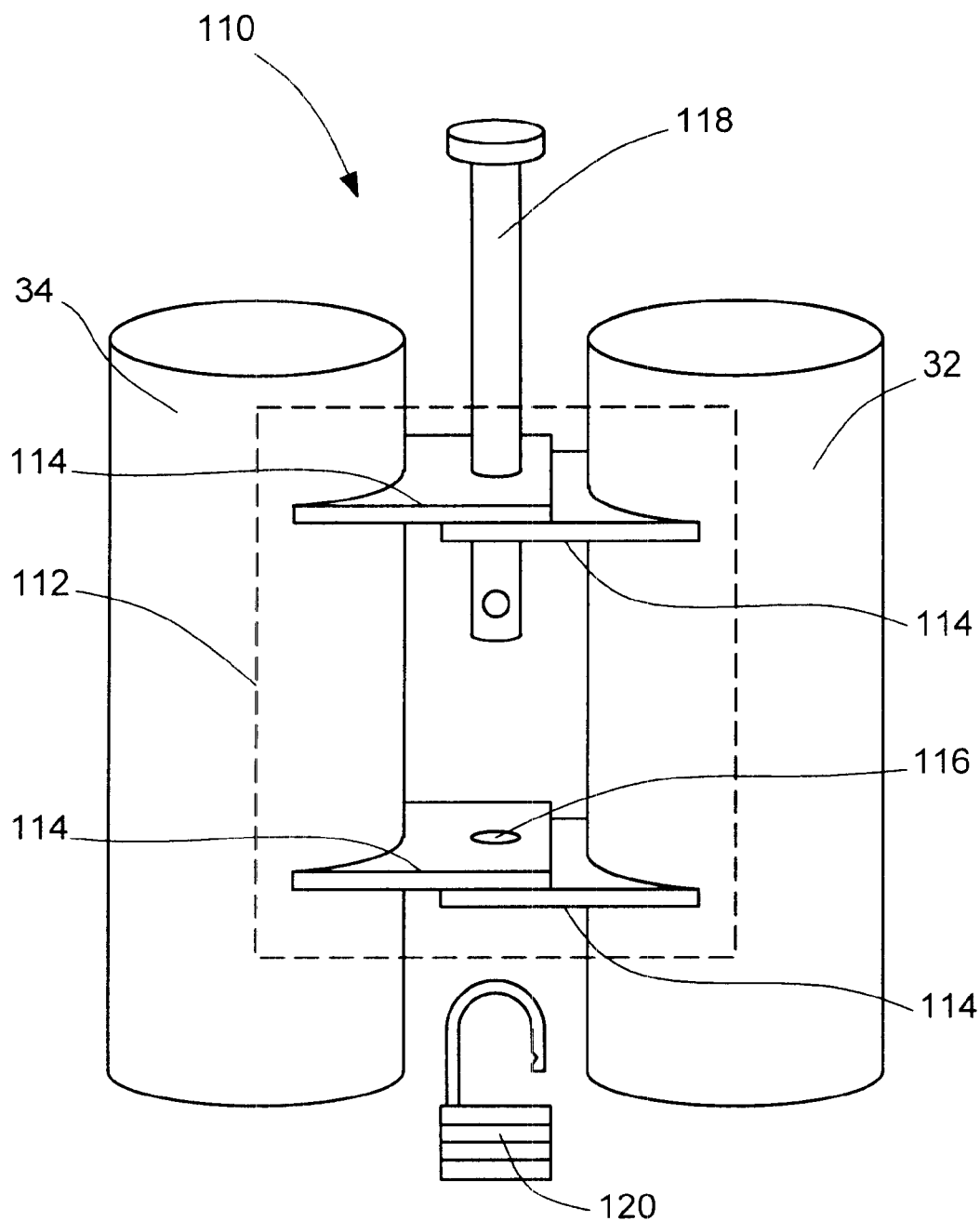
FIG. 9 is an isometric view of an embodiment of a gate locking mechanism of the present invention.

As shown in FIGS. 1, 2, 4, and 5, the two-part securing frames include a lock mechanism 110 for locking the right gate 32 to the left gate 34 in the closed. A preferred embodiment of the lock mechanism 110, shown in FIG. 9, includes a cover plate 112 (shown in outline) attached to one of the barriers 40. A pair of lock fingers 114 project from each barrier 40. The lock fingers 114 have lock pin holes 116 that align when the left and right gate 32, 34 are in the closed position, so as to permit the lock pin 118 to be inserted through the lock pin holes 116 and secured with a padlock 120. The cover plate 112 prevents tampering with the lock pin 118 and padlock 120.

Figure 10:
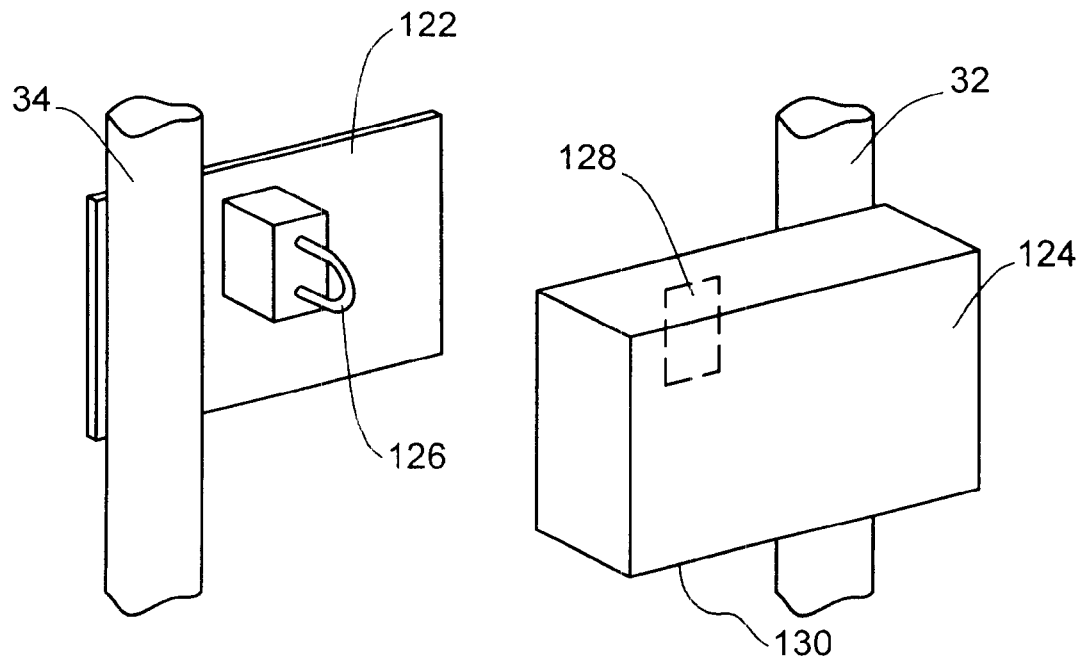
FIG. 10 is an isometric view of another embodiment of a gate locking mechanism of the present invention.
Figure 11:
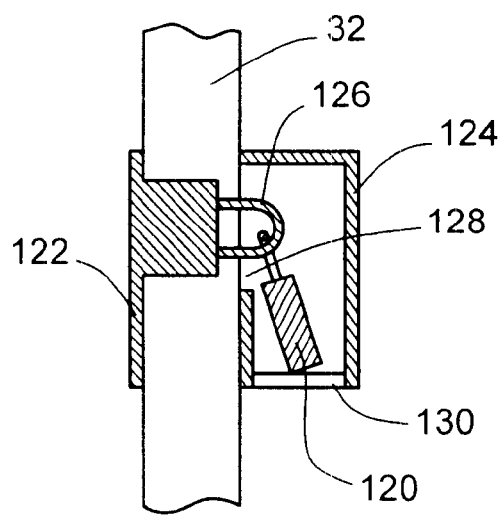
FIG. 11 is a sectional view of the gate locking mechanism of FIG. 10 shown in the locked position.

Another embodiment of the lock mechanism, shown in FIGS. 10 and 11, includes a backing plate 122 attached to one of the barriers 40 and a lock box 124 attached to the other barrier 40. The backing plate 122 has a projecting lock loop 126 attached to it. The lock box 124 has a loop opening 128, through which the lock loop 126 projects when the left and right gate 32, 34 are in position to prevent the tailgate 20 and window 24 from opening outwards. The lock box 124 has a bottom opening 130 through which a padlock 120 can be inserted to lock around the lock loop 126 so as to secure the lock loop 126 in the lock box 124 and thereby to lock the right gate 32 to the left gate 34. The lock box 124 protects the padlock 120 from blows, such as from a hammer, that might break the padlock 120, and makes it difficult to cut the padlock 120, such as with bolt cutters.

Figure 12:
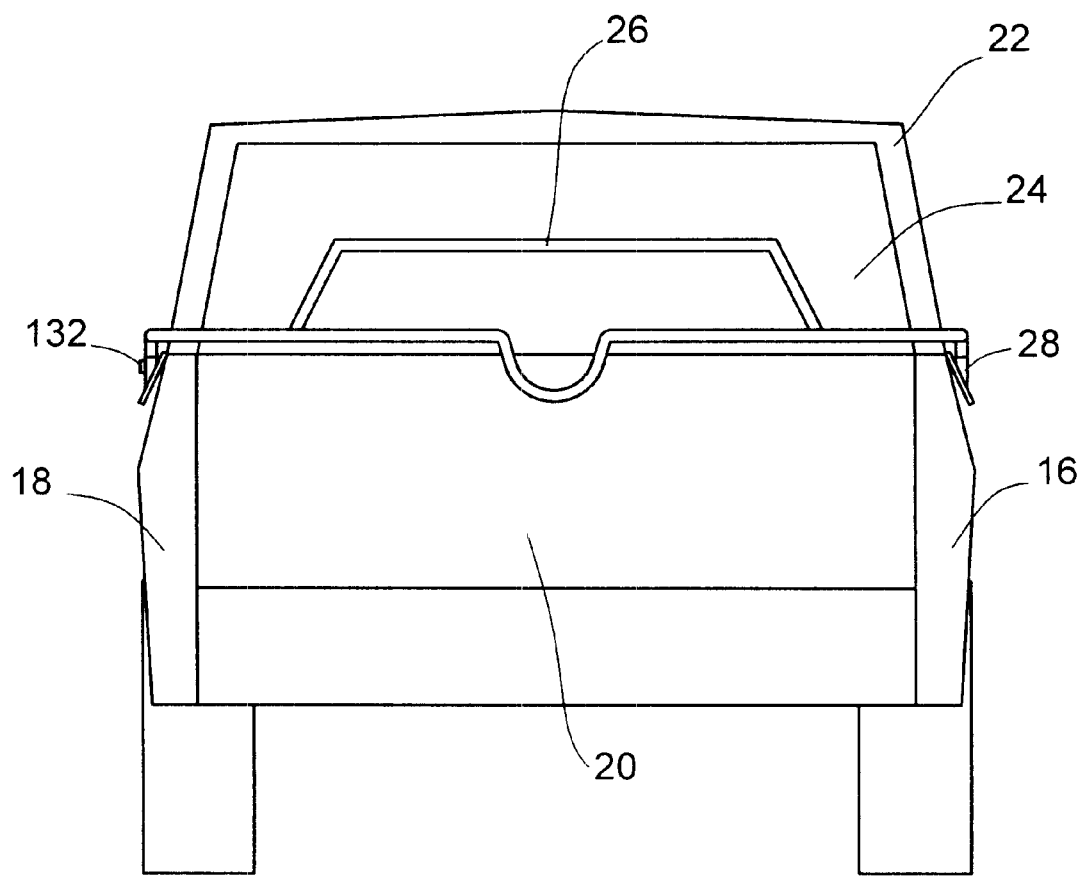
FIG. 12 is a rear elevation view of an embodiment of the present invention having a one-part securing frame.
Figure 13:
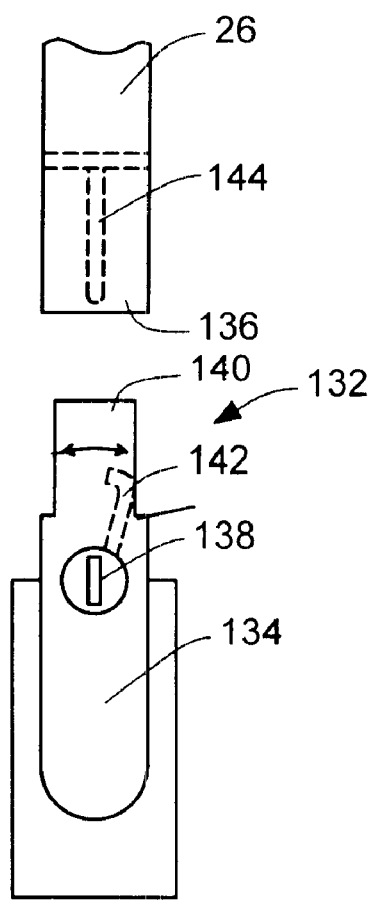
FIG. 13 is side elevation view of the mount lock shown in FIG. 12.
Figure 14:
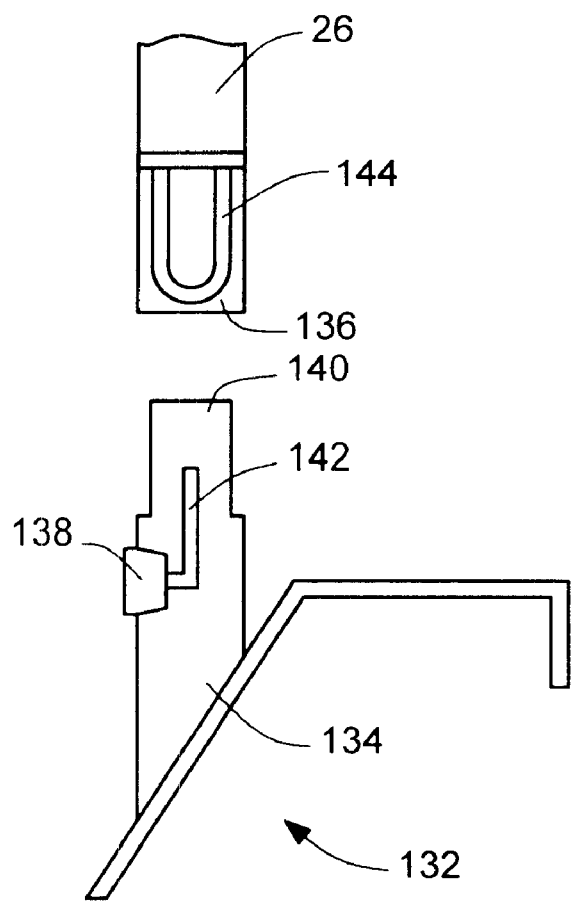
FIG. 14 is a rear elevation view of the mount lock shown in FIG. 12.
Figure 15:
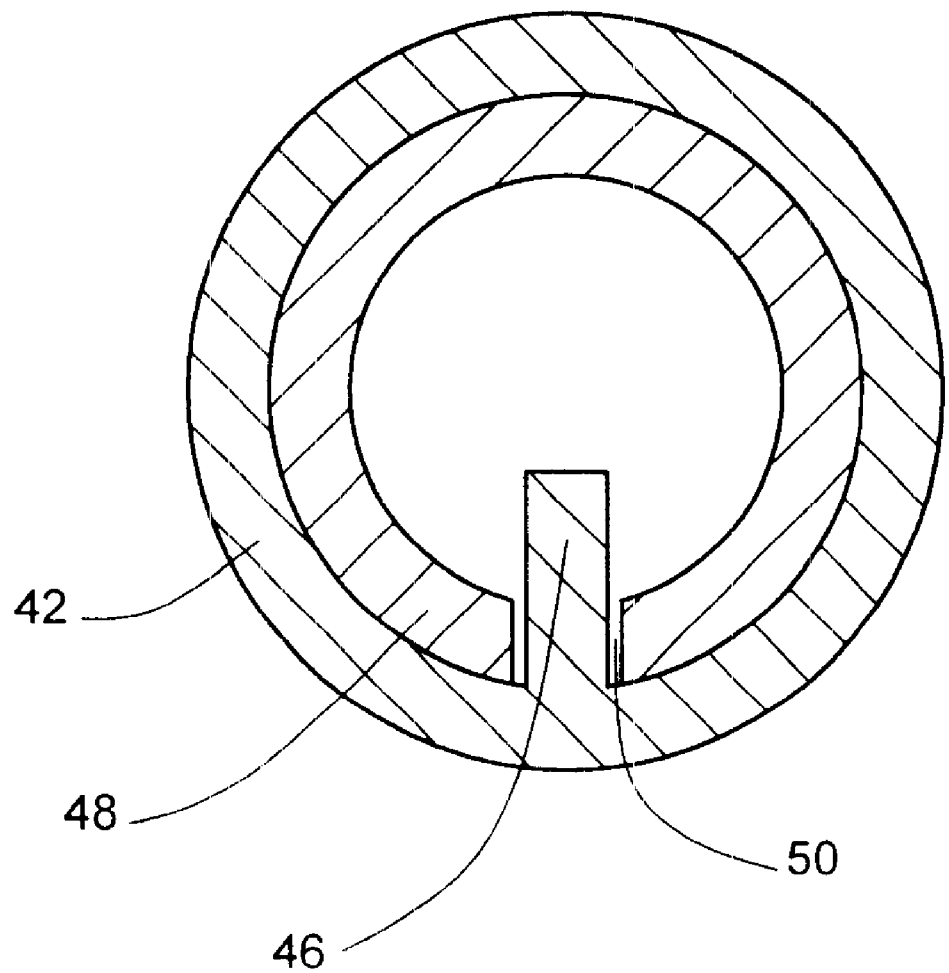
FIG. 15 is a sectional view of a portion of the embodiment of the invention shown in FIG. 5 taken along the line 15—15 in FIG. 5.

In another embodiment of the security apparatus 10, shown in FIGS. 12, 13 and 14, the securing frame 26 is one-part. As shown in FIG. 12, the right mount 28 is a pivoting mount having a plug 62 as described above and the left mount 28 has a mount lock 132. It will be clear that other pivoting mounts, such as the mount shown in FIGS. 6 and 7 can be used instead of the right mount 28 shown in FIG. 12. It will be clear that the mount lock 132 and pivoting mount could be on either side of the cargo box 14. However, it is preferable to locate the pivoting mount on the side of the pick-up vehicle 12 away from the traffic when the pick-up vehicle 12 is parked at the side of the road so as to prevent the securing frame from swinging into traffic. As shown in FIGS. 13 and 14, the mount lock plug 134 is sized for insertion into a downwardly-facing lock bore 136 within the securing frame 26. The lock plug 134 contains a key lock projecting into a lock cavity 140 and having a lock hook 142. The lock bore 136 contains an eye 144. When the lock plug 134 is inserted into the lock bore 136, the key lock 138 can be turned with a key (not shown) to hook the eye 144 with the lock hook 142 so as to lock the securing frame 26 to the mount lock 132.

Another possible, but non-preferred, embodiment (not shown) of the security apparatus 10 having a two-part securing frame 26, involves positioning the mounts 28, 30 at the back, outside corners of the side walls 16, 18, so that the gates 32, 34 can be straight, in that each gate need not bend around the adjoining corner of the canopy 22 and cargo box 14. Positioning the mount pivot axis so that it is diagonally offset a sufficient distance from the corner of the cargo box 14 permits swinging the gate forward and parallel to the respective side wall 16,18. Thus, the gates 32, 34 can be attached at the side walls 16,18 as an alternative to removing them in situations where it is preferable to not have to lock and unlock the gates each time the pick-up vehicle 12 is moved.

Another possible, but non-preferred, embodiment (not shown) of the security apparatus 10, involves configuring the L-shaped slot 68 so that it is not all the way through the material of the plug 62 but is merely a groove in the surface of the plug 62 extending horizontally further around the plug 62 than the shown L-shaped slot 68. The pin 72 can be sized so as to fit within the groove. In this way, the gates 32, 34 can be pivoted through a larger arc than possible with the L-shaped slot 68 shown in the drawings.

Another possible, but non-preferred, embodiment (not shown) of the security apparatus 10, involves making a pivoting means part of the securing frame 26 such that a short rectangularly-shaped tongue (such as square tubing)is pivotably attached to the main part of the securing frame, with a bend in the tongue as required so as to permit the tongue to be swung from a position beside, and roughly parallel to, the securing frame 26 through 270° to a position where the tongue is roughly 90° to the securing frame 26. The mount for such a securing frame 26/tongue arrangement comprises a mounting bracket having a rectangular bore (as within square tubing), sized so that the tongue can be inserted into it. In use, the mounting brackets re mounted at the back end of the side walls 16, 18, with the rectangular bore extending horizontally roughly parallel to the back of the cargo box 14. The mounting brackets might include a flat plate so that they can be mounted to the cargo box 14 by interposing the plate between the top of the sidewalls 16, 18 and the bottom of the canopy 22. In use, each tongue is inserted into the rectangular bore from the side of the cargo box 14 in a direction generally towards the center of the cargo box 14. When the tongue is inserted into the rectangular bore, the gates 32, 34 can be swung parallel to the tongue and locked into place. When the gates 32, 34 are locked to each other (or the securing frame 26 is locked to the other side of the cargo box in the case of the one-part securing frame 26), the gates 32, 34 are secure because the tongue cannot be removed from the rectangular bore, in that, in order to remove the tongue, the gates must be shifted sideways in the direction of the mounting bracket, which is prevented by the lock at the other end of the gate.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A releasably lockable security apparatus for use on a vehicle having a cargo box having an outward-opening tailgate, a first sidewall and a second sidewall, and having a canopy attached to the sidewalls and having a rear window or door, the security apparatus comprising:

(A) a generally-elongate securing frame having a first frame end and a second frame end;
   (B) means for securing the first frame end to the vehicle; and
   (C) means for securing the second frame end to the vehicle;

wherein, the first frame end and second frame end can be secured to the vehicle, in a closed position, such that the securing frame spans the rear of the cargo box and canopy so as to block opening movement of the tailgate and impede the removal of objects through the rear of the canopy.

2. The security apparatus of claim 1, wherein:

(A) the means for securing the first frame end to the vehicle comprises a first mount for attaching to the first side wall; and
   (B) the means for securing the second frame end to the vehicle comprises a second mount for attaching to the second side wall;

wherein, the first frame end and second frame end can be secured to the vehicle so that the securing frame extends generally horizontally across the rear of the cargo box and canopy.

3. The security apparatus of claim 2, wherein:

(A) the securing frame comprises
      (i) a first gate including the first frame end,
      (ii) a second gate including the second frame end, and
      (iii) means for releasably securing the first and second gates to each other in locked engagement; and
   (B) the security apparatus further comprises
      (i) means, proximate to the first frame end, for pivoting the first gate relative to the cargo box through a substantially horizontal arc, and
      (ii) means, proximate to the second frame end, for pivoting the second gate relative to the cargo box through a substantially horizontal arc;

wherein, when the first frame end and second frame end are secured to the vehicle, the first and second gates are securable to each other in locked engagement to prevent opening of the tailgate and canopy rear door, and the first and second gates are releasable from each other and pivotally mounted for swinging away from each other and from the tailgate and canopy so as to permit opening of the tailgate and the removal of objects through the rear of the canopy.

4. The security apparatus of claim 3, wherein:

(A) the means for pivoting the first gate comprises means for pivotally engaging the first frame end with the first mount; and
   (B) the means for pivoting the second gate comprises means for pivotally engaging the second frame end with the second mount.

5. The security apparatus of claim 4, wherein:

(A) the first and second mount each comprise, a first strap for attaching to the relevant side wall, the first strap being substantially horizontal when attached to the relevant side wall, and a second strap attached to the first strap, the first strap and second strap having a portion of their distal ends in a spaced substantially-parallel relationship;
   (B) the means for pivotally engaging the first and second frame ends with the first and second mounts, respectively, each comprise:
      (i) a first hole through the portion of the first strap in a spaced substantially-parallel relationship with the relevant portion of the second strap;
      (ii) a second hole through the portion of the second strap in a spaced substantially-parallel relationship with the relevant portion of the first strap and aligned with the first hole;
      (iii) a pivot cylinder, being part of the relevant gate and located at the proximal end of the relevant gate, disposed within the first and second holes, the pivot cylinder shaped and sized such that the pivot cylinder can rotate within the first and second holes;

wherein, when the relevant mount is attached to the vehicle, the first strap and second strap support the pivot cylinder in a substantially-vertical orientation and the pivot cylinder rotates about a substantially-vertical axis when the relevant gate is pivoted relative to the cargo box.

6. The security apparatus of claim 5, wherein, the first strap is above the second strap when the mount is attached to the relevant side wall; and the pivot cylinder has a top washer above and proximate to the first strap, and a bottom washer below and proximate to the second strap, the top washer and bottom washer each having a diameter greater than the relevant hole such that the top washer and bottom washer prevent the pivot cylinder from moving vertically relative to the mount.

7. The security apparatus of claim 5, wherein the first strap has a horizontally-extending planar portion for interposing between the top of the relevant sidewall and the bottom of the canopy, and a vertically depending member attached to the end of the planar portion and having a fastener hole, wherein the mount can be attached to the sidewall by interposing the planar portion between the relevant sidewall and the canopy and attaching the depending member to the inside top of the relevant sidewall with a fastener passing through the fastener hole and a hole drilled or otherwise provided in the inside top.

8. The security apparatus of claim 5, for use on a vehicle having side rails for mounting a roof rack, the side rails interposed between the sidewalls and the canopy and projecting horizontally outward for the purpose of supporting the roof rack, wherein the first strap includes a horizontally-extending planar portion having a fastener hole such that the board attachment plate can be positioned above or below the relevant side rail and attached to the side rail.

9. The security apparatus of claim 3, wherein:
(A) each gate pivoting means comprises:
  (i) a mounting bracket, for connecting to the respective side wall, having an upwardly-projecting cylindrical plug; and
  (ii) a socket, in the respective first or second frame end, opening downwards, and sized and shaped for receiving the plug, wherein the plug can be inserted into the socket;
(B) each means for securing the respective frame end to the vehicle comprises:
  (i) a securing pin projecting inward from the sidewall of the socket; and
  (ii) a recess in the side of the plug having a substantially-horizontally extending portion, the recess shaped and sized for receiving and containing the securing pin such that the securing pin can be positioned, by rotation of the plug relative to the bore, in the substantially-horizontally extending portion of the recess so as to prevent the plug from being withdrawn from the bore by a mere vertical movement of the respective first or second frame end relative to the plug;
wherein, the securing pin and recess are oriented such that when the plug is inserted into the bore and the respective gate is in position to prevent opening of the tailgate and canopy rear door, the securing pin is contained in the substantially-horizontally extending portion of the recess.

10. The security apparatus of claim 3, wherein the means for releasably securing the first and second gates to each other in locked engagement, comprises:
(A) a pair of spaced-apart first lock fingers attached to the distal end of the first gate, each first lock finger projecting distally and having a first lock pin hole, the first lock pin holes being aligned;
(B) a pair of spaced-apart second lock fingers attached to the distal end of the second gate, each second lock finger projecting distally and having a second lock pin hole, the second lock pin holes being aligned; and
(B) a lock pin, having, a shaft sized and shaped for insertion into the lock pin holes, a head, at one end of the shaft, sized and shaped so as to prevent the head from passing through the lock pin holes, and a lock hole, at the other end of the shaft, through which a padlock can be locked;
wherein, when the gates are in a position to block opening movement of the tailgate and impede the removal of objects through the rear of the canopy the first lock pin holes and the second lock pin holes align so that the lock pin can be inserted through the lock pin holes and locked in place with a padlock.

11. The security apparatus of claim 3, wherein the means for releasably securing the first and second gates to each other in locked engagement, comprises:
(A) a back plate attached to the first gate proximate to the distal end of the first gate;
(B) a lock loop attached to, and projecting from, the back plate; and
(C) a lock housing attached to the second gate proximate to the distal end of the second gate, the lock housing having a slot for receiving the lock loop when the gates are in position to block opening movement of the tailgate and impede the removal of objects through the rear of the canopy, and the lock housing having an opening for application of a padlock through the lock loop.

12. The security apparatus of claim 2, further comprising means proximate to the first frame end, for pivoting the securing frame relative to the cargo box through a substantially horizontal arc, wherein, when the second frame end is unsecured from the second side wall, the securing frame can be pivoted horizontally away from the rear of the vehicle so as to not impede opening movement of the tailgate and removal of objects through the rear of the canopy.

13. The security apparatus of claim 12, wherein the means for pivoting the securing frame relative to the cargo box comprises means for pivotally engaging the first frame end with the first mount.

14. The security apparatus of claim 12, wherein the second frame end securing means comprises:
(A) a mount lock for attaching to the second side wall, having an upwardly-projecting lock plug including an upward-opening lock cavity and a pivoting lock hook disposed within the lock cavity;
(B) a downwardly-opening lock bore in the second frame end, sized and shaped for receiving the upper end of the lock plug, and a downwardly projecting eye disposed within the latch bore, sized, shaped and positioned so as to project into the lock cavity when the lock plug is inserted into the lock bore;
wherein, when the lock plug is inserted into the lock bore, the lock hook can be pivoted to engage the eye so as to lock the second frame end to the lock mount.

15. The security apparatus of claim 2, wherein the security apparatus is provided with span-adjusting means for adjusting the span of the security apparatus so as to adapt the security apparatus for use with different vehicles having cargo boxes of different widths.

16. The security apparatus of claim 15, wherein
(A) the securing frame includes a first piece and a second piece; and
(B) the span-adjusting means comprises:
  (i) an adjustment insert projecting from the first piece substantially parallel to the longitudinal axis of the securing frame; and (ii) an adjustment bore in the second piece, sized, shaped and oriented so as to receive the insert;

wherein the span of the security apparatus can be adjusted by sliding the insert longitudinally within the bore.

17. The security apparatus of claim 16, further comprising means for preventing the insert from rotating within the bore comprising:

(A) an adjustment lug on the sidewall of the bore; and (B) a longitudinally-extending channel in the insert, sized, shaped and oriented for receiving the adjustment lug.

18. The security apparatus of claim 2, wherein the securing frame comprises an upper bar and a lower bar in a vertically-spaced-apart relationship, the upper bar positioned such that when the securing frame is in the closed position, the upper bar is proximate to the vertical midpoint of the canopy rear door.

19. For impeding unauthorized opening of a tailgate, rear door or window or similar cover located at or in the vicinity of the rear of a canopy-covered cargo box rearwardly mounted on a vehicle, and impeding removal of objects from the cargo box, a security apparatus comprising:

a securing frame that when in a closed position spans and closely overlies the tailgate, rear door or window or similar cover; the securing frame having end locking elements that are securable to mating mounts fixed to the side walls, in the vicinity of the rear of the vehicle, on opposite sides of the tailgate, rear door or window or similar cover.

20. The security apparatus of claim 19, wherein the securing frame has an open-frame configuration.

21. The security apparatus of claim 19, wherein the securing frame comprises:

(A) a first gate pivotally mating with a fir s t respective mount such the at the first gate can be swung through a substantially horizontal arc when installed; and (B) a second gate pivotally mating with a second respective mount such that the second gate can be swung through a substantially horizontal arc when installed.

22. The security apparatus of claim 21, further comprising a lock mechanism wherein the first gate and second gate can be releasably locked together in the closed position.

23. The security apparatus of claim 21, wherein each gates is releasable from the respective mount when the gate is in a position other than the closed position, such that the gates are secure when in the closed position but can be removed from the mounts when in a position other than the closed position.

\* \* \* \* \*